F. W. HODGES.
VALVE.
APPLICATION FILED FEB. 11, 1913.
1,169,485.
Patented Jan. 25, 1916.
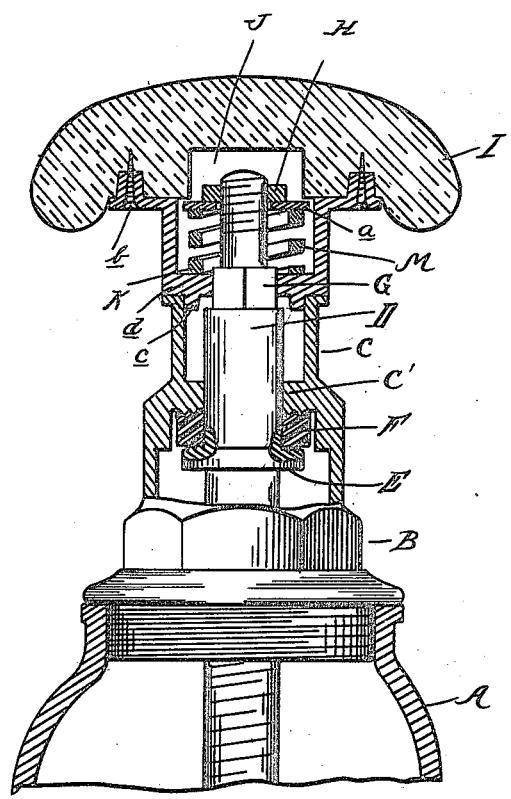

ing flange $c$ on the bottom or inner end $d$ of this spring-casing, this flange engaging within the tubular extension C to assist in retaining the spring casing in position on the top of the tubular extension. The bottom $d$ of the casing is provided with an aperture corresponding to the shape of the angular portion G of the stem, so as to form a driving connection between the two.

UNITED STATES PATENT OFFICE.

FREDERICK W. HODGES, OF DETROIT, MICHIGAN, ASSIGNOR TO DETROIT LUBRICATOR COMPANY, OF DETROIT, MICHIGAN, A CORPORATION OF MICHIGAN.

VALVE.

1,169,485.

Specification of Letters Patent.   Patented Jan. 25, 1916.

Application filed February 11, 1913. Serial No. 747,663.

*To all whom it may concern:*

Be it known that I, FREDERICK W. HODGES, a citizen of the United States of America, residing at Detroit, in the county of Wayne and State of Michigan, have invented certain new and useful Improvements in Valves, of which the following is a specification, reference being had therein to the accompanying drawings.

The invention consists in the construction of the bonnet and handle of a valve, together with the construction of the operating stem, in such a manner as to provide a convenient and economical form of packing and a simplified and desirable construction; and further in the construction, arrangement and combination of parts hereinafter more particularly described and pointed out in the claims.

Referring to the drawing, I have illustrated my invention in a simple figure showing a portion of the body of a valve, with the bonnet and handle attached thereto, the upper portion being in vertical central section.

A indicates the body or valve casing of an ordinary globe valve, or other type of valve, in which the valve is opened and closed by the rotation of the handle. The form and style of the valve proper being immaterial and forming no part of my invention I have not deemed it necessary to further illustrate the same.

Secured in the top of the casing, in the usual manner, is the bonnet B which has a tubular extension C. Within this tubular extension is an inwardly-extending annular flange or shoulder C' through which extends the valve stem D. On the valve stem is an annular flange E, below the shoulder C'; and between this flange on the stem and the shoulder C' is a suitable packing F.

The valve stem D extends above the top of the tubular extension C and is provided with a square or other angularly-shaped portion G and at the top is screw-threaded to receive a suitable nut H, below which may be placed, if desired, a washer $a$.

The handle, I, is provided centrally with a recess or chamber J. Secured to the underside of the handle, as by screws $b$, is the spring-casing or tubular member K, the lower end of which rests and is journaled on the upper end of the tubular extension C. I preferably provide a downwardly-extending flange $c$ on the bottom or inner end $d$ of this spring-casing, this flange engaging within the tubular extension C to assist in retaining the spring casing in position on the top of the tubular extension. The bottom $d$ of the casing is provided with an aperture corresponding to the shape of the angular portion G of the stem, so as to form a driving connection between the two.

Between the bottom $d$ of the spring casing and the nut H, or washer $a$, is a spring, which I have shown as a spiral spring, M, under tension and acting to draw the stem upward and thus force the flange E against the packing F and the packing against the shoulder C'. This construction, in which a spring casing is journaled on the top of the bonnet extension, simplifies and cheapens the construction, and by making the valve casing K as a complementary extension of the bonnet portion C I have added to the attractive appearance of the device.

The nut H can be adjusted by removing the securing screws $b$ and taking off the handle, if increased tension is desired in the spring.

The device is a desirable one to manufacture, is quickly and easily assembled, and is efficient to produce a tightly-packed valve.

Having thus described my invention, what I claim as new and desire to secure by Letters Patent is:

1. In a valve, the combination with a bonnet having an extension, of a valve stem passing centrally through said extension and having a squared portion opposite the outer end of the extension, said end being recessed to form a rim spaced from said stem, opposed shoulders on the bonnet and valve stem, retaining the stem against outward movement, a tubular member seated upon said rim of said extension, a wall at the inner end of said tubular member, having a central aperture engaging the squared portion of the stem, an abutment upon the outer end of the stem, a spring coiled within said tubular member and compressed between said wall and said abutment, and a handle secured to the outer end of the tubular member.

2. In a valve, the combination with a bonnet having an extension, of a valve stem passing centrally through said extension and formed with a squared portion adjacent the outer end of the extension, opposed shoulders on the bonnet and valve stem, retaining the latter against outward movement, a tubular member seated at one end upon said extension, said end being flanged inwardly and engaged with the squared portion of the stem, and the other end of said tubular member being outwardly flanged, a nut upon the outer end of the stem, a spring compressed between said nut and the inwardly extending flange, and a handle secured to the outwardly-extending flange, its inner face recessed to receive the end of said stem.

In testimony whereof I affix my signature in presence of two witnesses.

FREDERICK W. HODGES.

Witnesses:
 JAMES P. BARRY,
 PHYLLIS COBURN.